US010940698B2

(12) United States Patent
Lewis et al.

(10) Patent No.: US 10,940,698 B2
(45) Date of Patent: Mar. 9, 2021

(54) SYSTEM AND METHOD FOR HIGH ACCURACY PRINTING ON A 3D SURFACE

(71) Applicant: Xyrec IP B.V., Schiphol-Rijk (NL)

(72) Inventors: Christopher L. Lewis, Helotes, TX (US); Matthew M. Robinson, San Antonio, TX (US); Paul T. Evans, San Antonio, TX (US); Peter Boeijink, Schiphol-Rijk (NL); Branson P. Brockschmidt, San Antonio, TX (US)

(73) Assignee: Xyrec IP B.V., Schiphol-Rijk (NL)

( * ) Notice: Subject to any disclaimer, the term of this patent is extended or adjusted under 35 U.S.C. 154(b) by 0 days.

(21) Appl. No.: 16/282,350

(22) Filed: Feb. 22, 2019

(65) Prior Publication Data

US 2020/0269601 A1  Aug. 27, 2020

(51) Int. Cl.
*B41J 3/407* (2006.01)
*B41J 3/54* (2006.01)
*B41J 11/00* (2006.01)

(52) U.S. Cl.
CPC ............. *B41J 3/4073* (2013.01); *B41J 3/543* (2013.01); *B41J 11/008* (2013.01)

(58) Field of Classification Search
CPC ......... B41J 3/4073; B41J 3/543; B41J 11/008
See application file for complete search history.

(56) References Cited

U.S. PATENT DOCUMENTS

| 5,318,254 A | 6/1994 | Shaw et al. |
| 8,413,493 B1 | 4/2013 | Polywoda, III |
| 9,527,275 B1 | 12/2016 | Flannigan et al. |
| 2001/0053302 A1 | 12/2001 | Ansell et al. |
| 2006/0068109 A1 | 3/2006 | Frankenberger et al. |
| 2008/0198193 A1 | 8/2008 | Cook et al. |
| 2010/0279013 A1 | 11/2010 | Frankenberger et al. |
| 2013/0257984 A1 | 10/2013 | Beier et al. |

(Continued)

FOREIGN PATENT DOCUMENTS

| EP | 2641661 A1 | 9/2013 |
| EP | 2799150 A1 | 11/2014 |

(Continued)

OTHER PUBLICATIONS

IP.com search (Year: 2020).*

*Primary Examiner* — Lisa Solomon
(74) *Attorney, Agent, or Firm* — N.V. Nederlandsch Octrooibureau; Catherine A. Shultz; Katelyn J. Bernier

(57) ABSTRACT

A method and system for printing an image on a 3D surface is provided, wherein a printing robot is controlled to first carry out an encoder pattern capture run. During this run a print head of the robot is controlled to track an encoder pattern, which may be slightly distorted, on the 3D surface while inertial data from an inertial data measurement unit that is fixed to the print head is stored together with orientational and positional data derived from an image captured of a portion of the encoder pattern that is captured by a camera mounted on the printing head. Next, during a printing run, the print head is controlled such that the camera tracks the encoder pattern for a second time, while printing by the print head and/or a position of the print head is adjusted based on the inertial and orientational and positional data that were stored during the encoder pattern capture run.

15 Claims, 5 Drawing Sheets

(56) References Cited

U.S. PATENT DOCUMENTS

| | | | |
|---|---|---|---|
| 2014/0076985 A1 | 3/2014 | Pettersson et al. |
| 2016/0229208 A1 | 8/2016 | Neeb et al. |
| 2016/0355026 A1 | 12/2016 | Mathis et al. |

FOREIGN PATENT DOCUMENTS

| | | | |
|---|---|---|---|
| JP | 2009214040 A | 9/2009 |
| JP | 2015051506 A | 3/2015 |
| JP | 2016172379 A | 9/2016 |
| WO | 2016173668 A1 | 11/2016 |

\* cited by examiner

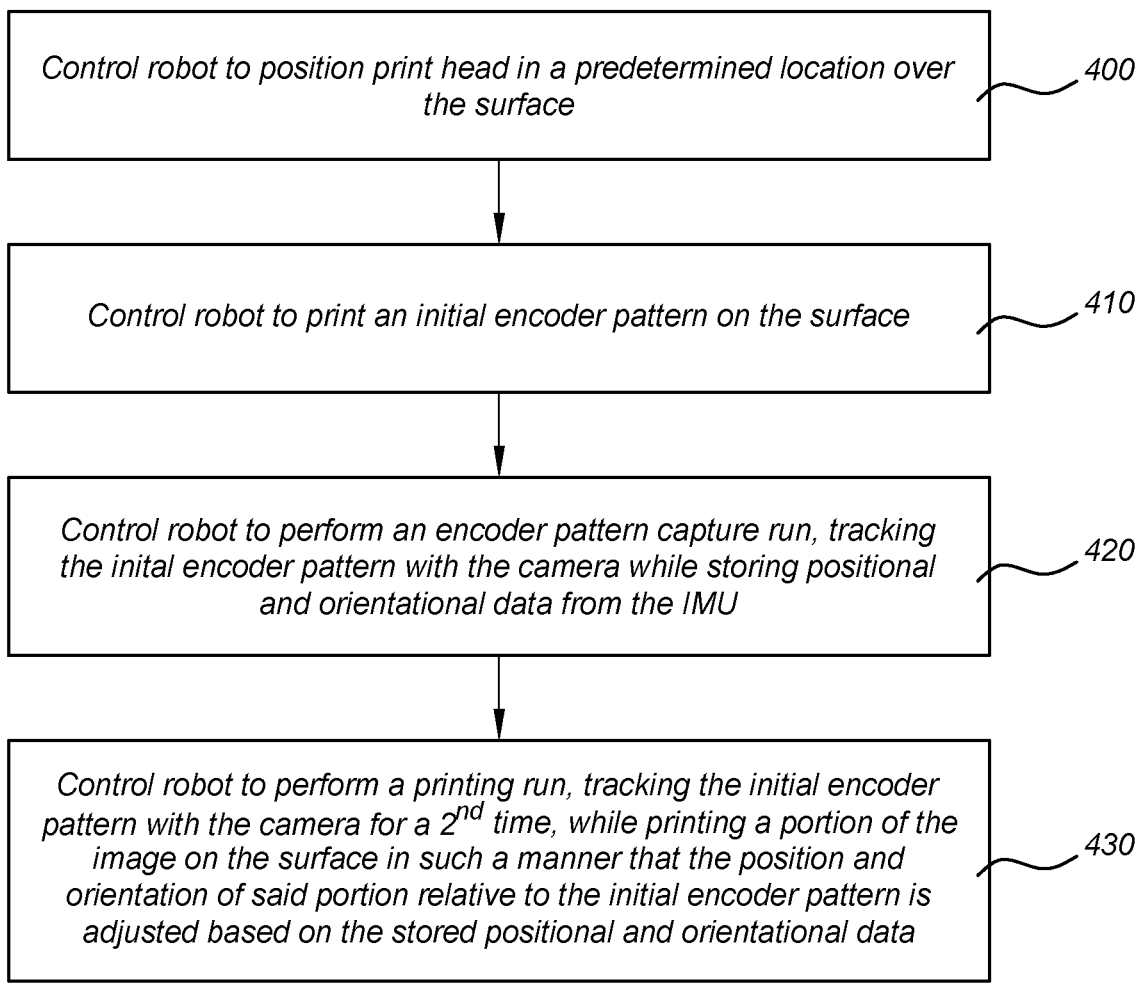

SYSTEM AND METHOD FOR HIGH ACCURACY PRINTING ON A 3D SURFACE

FIELD OF THE INVENTION

The present invention relates to a system and method for high accuracy printing on a 3D (three dimensional) surface, in particular a curved 3D surface, using one or more print heads that are mounted on the end of a positioning device.

BACKGROUND ART

U.S. patent application Ser. No. 15/044,764, which is hereby incorporated by reference, describes a liquid application system comprising: at least one print head that includes: a first liquid ejector to deposit a pigmented liquid on a surface; a second liquid ejector to deposit a liquid on the surface; and at least one image acquisition device; a plurality of actuatable elements operably coupled to the at least one print head; and a print head controller communicably coupled to the first liquid ejector, the second liquid ejector, the plurality of actuatable elements, and the at least one image acquisition device, wherein the print head controller is adapted to: align the first liquid ejector with an encoder pattern on a first portion of the surface, the alignment based at least in part on image data received from the at least one image acquisition device; cause the first liquid ejector to selectively deposit the pigmented liquid as a graphic swath across at least a portion of the encoder pattern on the first portion of the surface; and cause the second liquid ejector to selectively deposit the liquid as the encoder pattern on a second portion of the surface.

Once a swath with an initial encoder pattern has been printed on the surface with sufficient accuracy, the known system provides mechanisms for countering vibrations and maintaining alignment of subsequent swaths with the initial encoder pattern. However, when printing the first encoder pattern the print head is subject to structural vibrations, which may result in distortions of the first encoder pattern which can propagate to the image that is printed. In order for the image to be printed accurately without significant distortion, such structural vibrations should at least partially be accounted for.

It is an object of the present invention to provide a system and method which allow an encoder pattern that is applied to a surface on which the image is to be printed to be used for high accuracy printing on a curved surface.

SUMMARY OF THE INVENTION

To this end, the according to a first aspect the invention provides a method for printing an image onto a three dimensional curved surface of an object, such as an aircraft, using: a printing robot comprising a base, an arm supported by the base and moveable relative to the base, a print head having a plurality of nozzles coupled to a source of printing medium, the arm carrying the print head, wherein the print head is adapted for ejecting printing medium based on a control signal and is moveable relative to the base in at least six degrees of freedom of movement for causing relative movement of the print head along the curved surface, the printing robot further comprising a camera arranged at the end of the arm and adapted for capturing images of the curved surface; an internal position determination system comprising a plurality of sensors for determining a position and orientation of the print head relative to the base; and an inertial measurement unit (IMU) fixed with respect to the print head and adapted for providing inertial data on the print head; the method comprising the steps of: during an encoder pattern capture run: controlling the printing robot to move the print head across a first swath of the surface in such a manner that the camera tracks an initial encoder pattern on the surface, and, during the movement of the print head, storing in a memory inertial data measured by the IMU together with associated positional and orientational data of the camera relative to the initial encoder pattern derived from portions of the initial encoder pattern captured by the camera during the movement; and during a printing run: controlling the printing robot to move the print head across said first swath in such a manner that the camera tracks the initial encoder pattern on the surface, and controlling the movement of the print head and controlling the nozzles to eject printing medium onto the surface to print a portion of the image on the surface in such a manner that the orientation and/or position of said portion relative to the initial encoder pattern is adjusted based on the inertial data and associated positional data of the camera that was stored in the memory during the encoder pattern capture run.

Generally, the different portions that make up the initial encoder pattern will be somewhat distorted, e.g. a main axis of the initial encoder pattern will not be completely aligned along a straight line on the surface on which the image is to be printed. Besides being somewhat distorted in a nonlinear fashion, the initial encoder may be stretched or compressed, e.g. due to changes in velocity of the print head relative to the surface during printing of the initial encoder pattern.

In prior art systems, when an initial encoder pattern on the surface is distorted, an image that is subsequently printed on the surface while tracking the encoder pattern would be distorted in a similar fashion. For instance, if the initial encoder pattern should extend along a straight line on the surface but is applied slightly distorted along a curve, then the top edge of the printed image would be substantially parallel to the curve and the distortion could propagate through the printed image. If the initial encoder pattern were distorted by stretching during application of the pattern on the surface, the top edge of the image would be stretched in a similar manner.

By measuring and storing inertial data together with associated positional and orientational data of the camera relative to the encoder pattern during the encoder pattern capture run, a measure of the distortion of the encoder pattern on the surface can be determined. The present invention allows to substantially compensate for such distortion of the initial encoder pattern during one or more printing runs, so that the image may be printed on the surface with high accuracy. For instance, when an encoder pattern on the surface has been distorted such that it extends along a curve, then the top edge of an image printed according to the present method may still lie on a substantially straight line, rather than parallel to the curve. Similarly, if the encoder pattern has been distorted by stretching, e.g. non-uniform stretching, during application of the pattern on the surface, then present invention allows the image to be printed substantially without being distorted correspondingly. Thus, by adjusting how the image, or a portion thereof, is printed on the surface during a printing run, based on the data that was measured stored during the encoder pattern capture run, improved accuracy in positioning of the print head may be achieved.

Examples of suitable encoder patterns include an absolute encoder pattern and a periodic encoder pattern, any known pseudo random pattern, a Gray-coded binary pattern, and the like. In some embodiments, the encoder pattern may be physically displaced or offset from a swathe of the image that is printed on the surface, or the encoder pattern may be applied as a portion of the swathe (e.g., along an edge of the image to be printed) or over at least a portion of the swathe (e.g., as an optically clear pigmented fluid visible under ultraviolet light).

From each captured image of the encoder pattern, possibly augmented with the positional and orientational data from the internal position determination system, it can be determined at which relative location in the encoder pattern the image has been captured. As the position of the camera is fixed with respect to the print head, it is also possible to determine a position and orientation of the print head relative to the encoder pattern, at least along the curved surface.

Preferably, during the encoder pattern capture run the print head is moved across the first swath at a lower speed than during the printing run. By measuring the data during the encoder pattern capture run at a relatively low speed, the effect of structural vibrations of the robot on the measurements may be reduced. Each run in which a swath of the image is printed will be carried out faster, e.g. at least twice as fast, as the encoder pattern capture run.

In an embodiment the image is stored in a memory, and the adjustment of the orientation and/or position of the printed portion relative to the initial encoder patter comprises one or more of: adjusting the nozzle ejection timing; dynamically offsetting the image the memory; and adjusting the position and/or orientation of the print head relative to the arm. The inertial data and positional and orientational data which are stored during the encoder pattern capture run may be stored in in a same memory along with the image to be printed.

In an embodiment the method further comprises the step of, prior to the encoder pattern capture run, a step of providing the initial encoder pattern across the first swath of the surface. This may comprise determining an initial position on the surface, e.g. using an external reference system, and subsequently providing the encoder pattern on the surface with an end of the encoder pattern at the initial position.

In a preferred embodiment the step of providing the initial encoder pattern comprises controlling the printing robot to move the print head across a first swath of the surface while printing the initial encoder pattern on said first swathe. Thus, personnel may maintain a distance to the surface and/or to the robot, while the encoder pattern is applied to the surface. In this manner personnel safety is improved. Additionally, as the printing robot prints the initial encoder pattern on the surface, the camera of the printing robot will also be able to track the initial encoder pattern.

In alternative embodiment the step of providing the initial encoder pattern comprises either projecting the initial encoder pattern on said first swath of the surface using a light projector that is spaced apart from the printing robot, or attaching a marker strip, which comprises the initial encoder pattern, on the first swath of the surface. In case a light projector is used, the light projector is preferably arranged, when seen in top view, between the base and the surface on which the pattern is projected. In case the marker-strip is used, the marker strip is preferably removably attached to the surface, e.g. by means of an adhesive, so that the strip can easily be removed after the image has been printed on the surface.

In an embodiment the controller is adapted for controlling the printing robot to position the print head, during the encoder pattern capture run and/or during the printing run, to compensate for high frequency vibrations of the print head based on the inertial data sensed by the IMU during said run.

In an embodiment the image is a photo or a logo to be printed on the surface at a resolution of 200 DPI (dots per inch) or greater. Tracking an encoder pattern on the surface when printing the image is especially advantageous at such a high resolution.

In an embodiment the print head is an ink-jet print head.

In an embodiment the printing robot is further provided with one or more distance sensors which are fixed with respect to the print head and are adapted for measuring a distance of the print head to the curved surface, wherein the controller is further adapted for controlling the print robot to maintaining the print head at a distance of between 0.2 to 1.2 cm to the surface when printing medium is ejected from the nozzles.

In an embodiment the print run comprises printing a further encoder pattern on the surface, to be used in printing an adjacent swath of the image during a subsequent printing run. The further encoder pattern that is printed on the surface preferably corresponds substantially to the initial encoder pattern that has been adjusted based on the data stored during the encoder pattern capture run. Thus, if the initial encoder pattern was distorted, the further encoder pattern may be printed on the surface in a substantially less distorted manner. During the subsequent printing run the adjacent swath of the image may thus be printed by tracking the further encoder pattern without adjusting for distortions of the initial encoder pattern and/or the further encoder pattern. Further printing runs can thus be carried out in the manner described in U.S. patent application Ser. No. 15/044,764.

In an embodiment during the encoder pattern capture run, positional and orientational data provided by encoders of the robot are stored along with the inertial data measured by the IMU and the orientational and positional data derived from the encoder pattern, and wherein during the printing run the adjustment is further based on the stored positional and orientational data provided by the encoders. For instance, encoders may be provided which provide data on relative movement between the base and the mast, between the mast and the arm, and between the arm and the wrist of the printing robot. By storing positional and/or orientational data from three different source, i.e. data derived from portions of the encoder pattern captured by the camera, data measured by the IMU(s) and data from the encoders, an accurate estimate of distortion of the encoder pattern on the surface can be calculated. During the printing run the print robot can be controlled to at least partially adjust for such a distortion.

According to a second aspect, the invention provides a system for printing an image onto a three dimensional curved surface of an object, such as an aircraft, the system comprising: a printing robot comprising a base, an arm supported by the base and moveable relative to the base, a print head having a plurality of nozzles coupled to a source of printing medium, the arm carrying the print head, wherein the print head is adapted for ejecting printing medium based on a control signal and is moveable relative to the base in at least six degrees of freedom of movement for causing relative movement of the print head along the curved surface, the printing robot further comprising a camera arranged at the end of the arm and adapted for capturing images of the curved surface; an internal position determination system comprising a plurality of sensors for determining a position and orientation of the print head relative to the base; and an inertial measurement unit (IMU) fixed with respect to the print head and adapted for providing inertial data on the print head; the system further comprising a controller adapted for: during an encoder pattern capture run: controlling the printing robot to move the print head across a first swath of the surface in such a manner that the camera tracks an initial encoder pattern on the surface, and, during the movement of the print head, storing in a memory inertial data measured by the IMU together with associated positional and orientational data of the camera relative to the initial encoder pattern derived from portions of the initial encoder pattern captured by the camera during the movement; and during a printing run: controlling the printing robot to move the print head across said first swath in such a manner that the camera tracks the initial encoder pattern on the surface, and controlling the movement of the print head and controlling the nozzles to eject printing medium onto the surface to print a portion of the image on the surface in such a manner that the orientation and/or position of said portion relative to the initial encoder pattern is adjusted based on the inertial data and associated positional data of the camera that was stored in the memory during the encoder pattern capture run. The system thus is adapted for first carrying out an encoder pattern capture run during which no part of the graphic image is printed, and subsequently retraversing a path along the initial encoder pattern and printing one or more portions of the image while compensating for distortion of the encoder pattern on the surface.

In an embodiment the first swath extends substantially linearly and wherein the controller is adapted for controlling the print robot relative to the surface during movement of the print head across the first swath in such a manner that the print head is moved in a non-linear manner relative to the base and/or in such a manner that during movement of the print head across the first swath the print head is moved relative to the curved surface at a variable speed.

In an embodiment the printing robot comprises a vertical mast of a height of at least 10 m, wherein the vertical mast is supported on the base and rotatable relative to the base around a vertical axis, wherein the arm is moveably supported by the mast in such a manner that the arm can move relative to the mast along the vertical axis and is rotatable relative to the mast about a horizontal axis, the arm having a length of at least 5 m.

In an embodiment the nozzles of the print head span an area that is smaller than an area of the image that is to be printed on the surface.

In an embodiment the printing robot is provided with one or more distance sensors which are fixed with respect to the print head and are adapted for measuring a distance of the print head to the curved surface, and wherein the controller is further adapted for controlling the print robot to maintaining the print head at a distance of between 0.2 to 1.2 cm to the surface when printing medium is ejected from the nozzles, preferably a distance of between 0.3 to 1 cm.

In an embodiment the controller is adapted for controlling the printing robot to position the print head, during the encoder pattern capture run and/or during the printing run, to compensate for high frequency vibrations of the print head based on the inertial data sensed by the IMU during said run.

In an embodiment the robot further comprises encoders for sensing positional and/or orientational data of components of the robot, wherein the controller is further adapted for, during the encoder pattern capture run, storing the positional and/or orientational data sensed by the encoders in the memory along with the inertial data measured by the IMU and the positional and orientational positional data derived from the encoder pattern, and wherein the controller is adapted for, during the printing run, printing the portion of the image further based on the stored orientational and/or positional data from the encoders. For instance, encoders may be provided which provide data on relative movement between the base and the mast, between the mast and the arm, and between the arm and the wrist of the printing robot.

BRIEF DESCRIPTION OF THE DRAWINGS

The present invention will be discussed in more detail below, with reference to the attached drawings, in which:

FIGS. 3 and 4 respectively show flow charts of methods according to the invention.

DESCRIPTION OF EMBODIMENTS

Figure 1A:
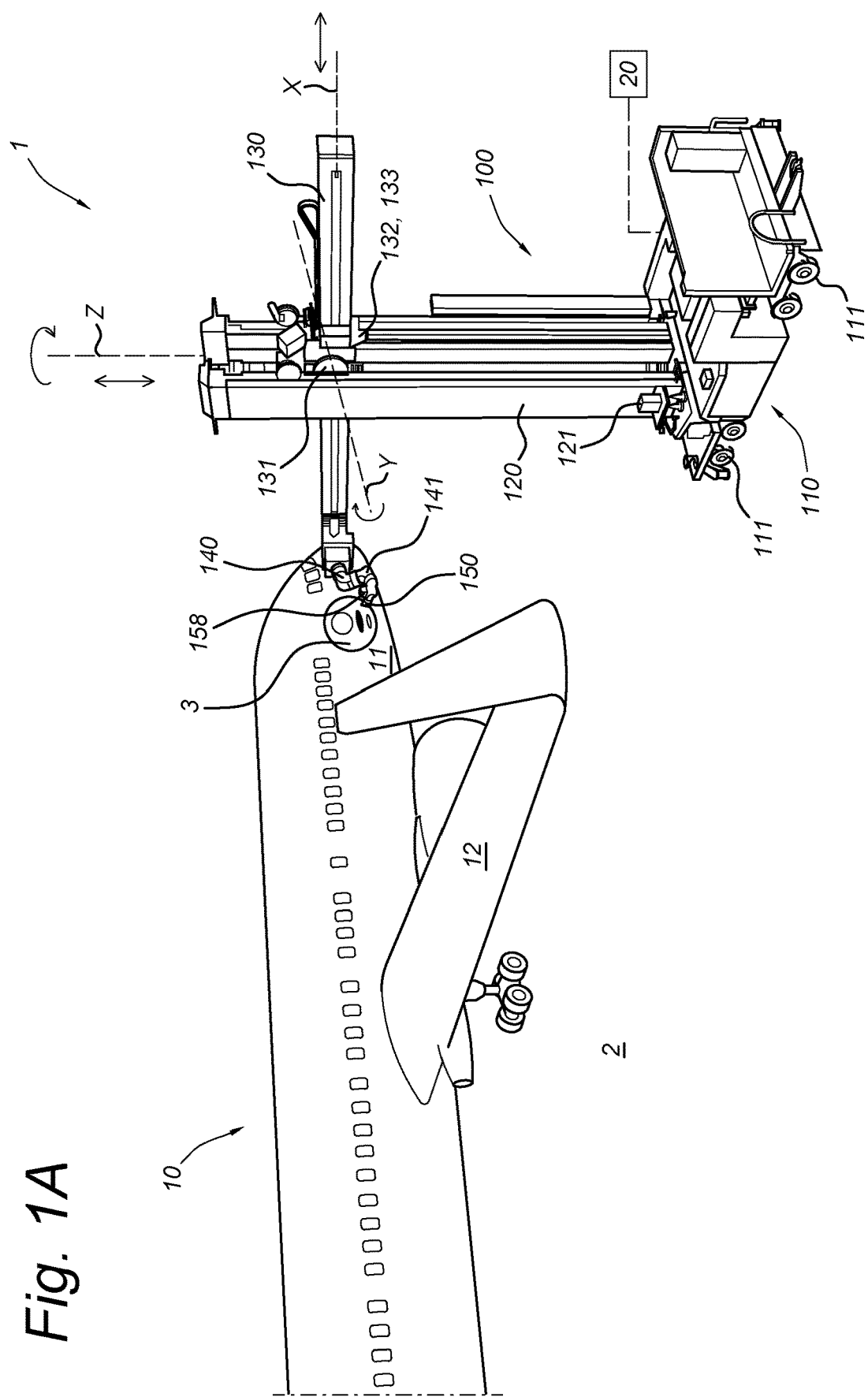
FIGS. 1A, 1B and 1C respectively show schematically a system according to the present invention, and details thereof.

FIG. 1A schematically shows a perspective view of a printing system 1 according to the invention for printing an image 3 onto one or more curved 3D surfaces 11, 12 of an airplane 10. The system 1 comprises a mobile printing robot 100 and a schematically depicted controller 20 for controlling movement of the robot as well as for controlling ejection of ink from a print head 150 to print a graphic image. The printing robot 100 comprises a base 100 with actuated wheels 111 for driving movement of the robot across floor 2 around the airplane 10. The wheels 111 are connected to the base via a flexible suspension system to allow for smooth driving and stable parking for operations.

Figure 1B:
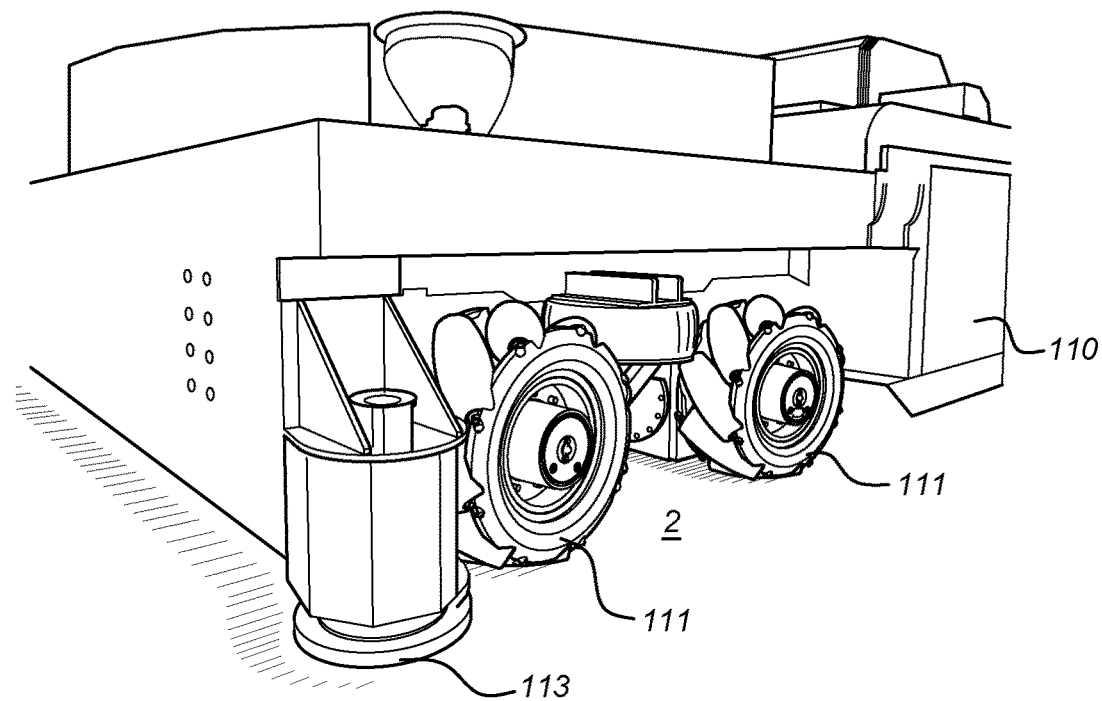
Figure 1C:
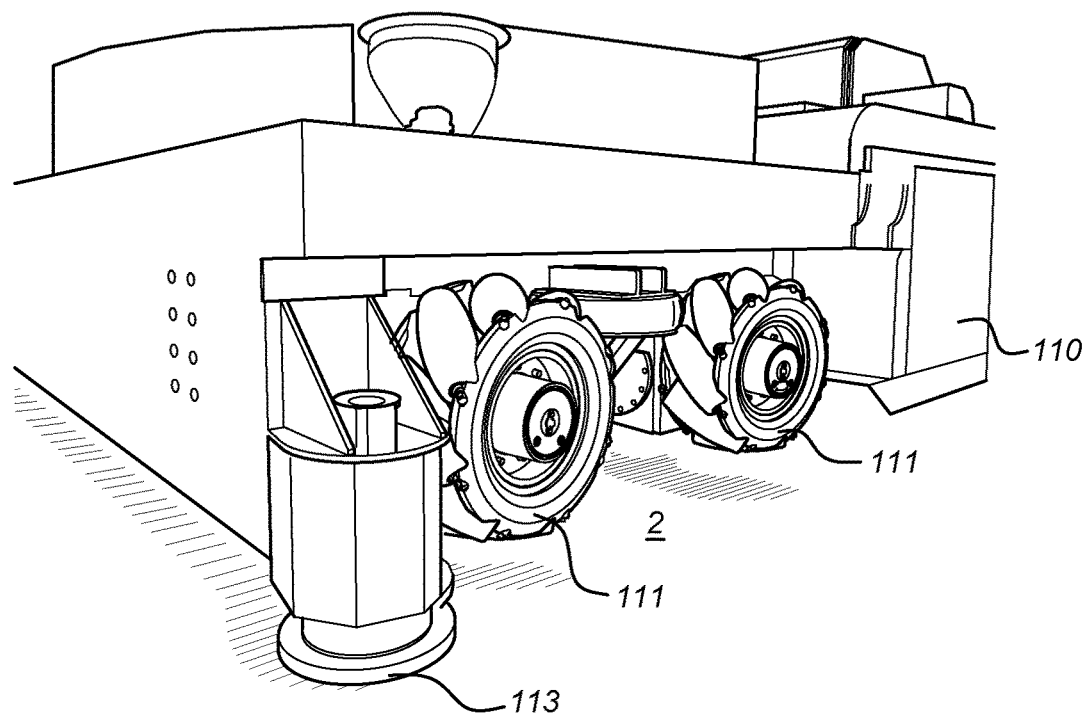

FIG. 1B shows a detail of the printing robot 100 in a drive mode in which its wheels 111 contact the floor 2 so that the robot can be driven across the floor. The base is further provided with supports, which are spaced apart from the floor 2 when the robot is in the drive mode. FIG. 1C shows the printing robot in a park mode in which the base of the robot is supported on the floor 2 on the supports 113 and in which the wheels 11 are spaced apart from the floor 2. When the robot is in park mode, its base is stationary to the floor, and the robot can be used for printing an image on the surface 11 substantially without being hindered by moment of the base relative to the floor 2 or to the surface 11.

Though in FIG. 1A the curved surfaces 11,12 are outer surfaces of the airplane 10, it should be understood that the printing system 1 could be used for printing an image onto 3D surfaces of vehicles or structures, such as helicopters, ships, trucks, cars, underwater vehicles, space craft; or any vehicles or structures that involve large areas and/or complicated positioning to reach all surfaces.

Referring back to FIG. 1A the robot comprises a substantially vertically extending mast 120 which is supported on the base in 110 in such a manner that the mast can rotate relative to the base around an axis Z which extends substantially vertically from the base 110. The mast 120 in turn supports an arm 130 which can be translated relative to the mast 120 along the axis Z as well as along a longitudinal direction X of the arm. The arm can also be rotated relative to the mast 120 around a substantially horizontal axis Y which extends perpendicular to the longitudinal direction X of the arm.

At an end of the arm 130, a wrist section 140 is provided to which a print head 150 is attached. The print head is provided with a plurality of nozzles for ejecting ink on the surface, and is further provided with a camera, which is shown schematically in FIG. 2A.

The mast 120 is provided with an encoder 121 which measures a rotational position of the mast relative to the base 110 around the Z-axis. The arm 130 in turn is provided with an encoder 131 which measures a rotational position of the arm 130 relative to the mast 120 around the axis Y, and is further provided with an encoder 132 which measures a translational position of the arm 130 relative to the horizontal axis Y, and an encoder 133 which measures a translational position of the arm 130 relative to the mast along the Z-axis. The wrist 140 is provided with one or more encoders 141 for determining rotational and translational position of the print head relative to the end of the arm 130 where the wrist is attached to the arm. The encoders 121, 131, 132, 133 and 141 are all part of an internal position determination system for determining a position and orientation of the print head 150 relative to the base 110. The internal position determination system further comprises an IMU 158 which is fixed to the print head 150.

Using the system 1, a graphical image 3, such as a photo or a logo, can be printed on a portion of the outer surface 11 of the airplane 10 as follows. First the wheels 111 are controlled to move the base across the floor 2 until the base is at a position in which the print head 150 can be arranged close to yet spaced apart from the surface on which the image is to be printed. Next, the flexible support is controlled to lift the wheels 111 from the floor until the base is substantially stationarily supported on the supports 113 with respect to the floor 2 and the robot is in a parked mode. This substantially prevents the base from rolling across the floor during printing, e.g. when the mast and/or arm are moved relative to the base.

Once the robot is in the parked mode, coarse positioning of the print head relative to the surface 11 may be carried out by controlling rotation of the mast 120 relative to the base around the Z-axis, and by controlling translation as well as rotation of the arm 130 relative to the mast. A more fine grained positioning of the print head 150 relative to the surface 11 may be carried out by actuation of the wrist 140 via which the print head 150 is supported at an end of the arm 140. The wrist 140 provides the print head with 6 degrees of movement relative to the end of the arm.

Figure 2A:
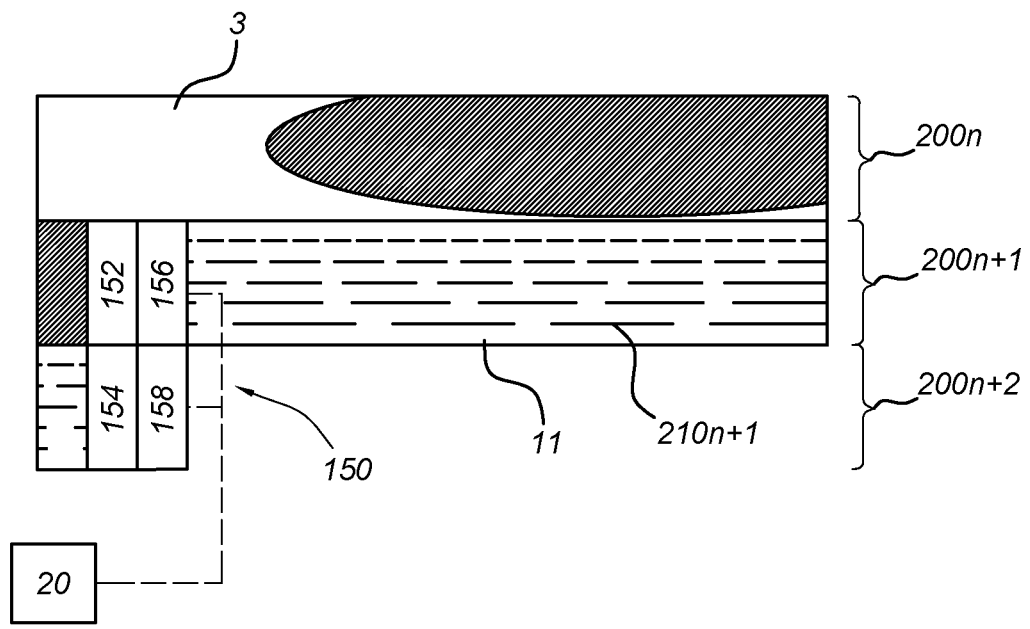
FIGS. 2A and 2B respectively show an initial encoder pattern as it would ideally have been provided on a curved surface, and the same encoder pattern as it is applied in a distorted fashion on the surface, in an exaggerated manner.
Figure 2B:
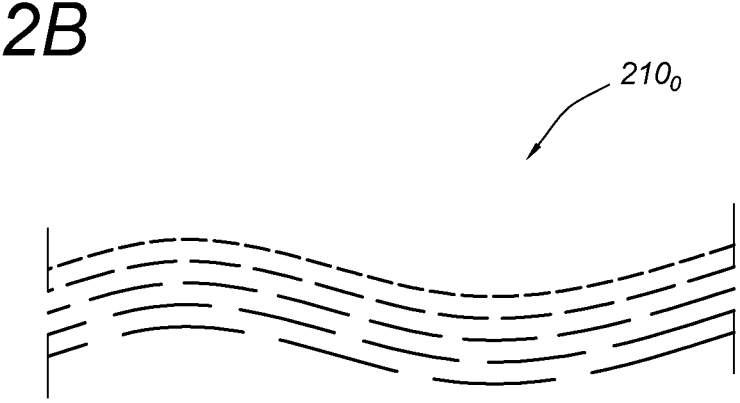

During such fine grained positioning the robot is controlled to move the print head such that the nozzles of the print head are moved to within a predetermined distance of between 0.2 and 1.2 cm, of the surface 11 on which the image 3 is to be printed. For this purpose, the print head 140 is provided with one or more distance sensors for measuring a distance of the print head to a surface in front of the print head. A suitable print head for use with the robot 100, and which includes such distance sensors, is shown in FIGS. 2A and 2B of U.S. patent application Ser. No. 15/044,764 which is incorporated by reference.

The print head is kept spaced apart from the surface to prevent damage to the surface, and by placing the nozzles of the print head at a relatively short distance from the surface, it is possible to eject ink droplets from the print head at a resolution of 200 DPI or more on the surface. FIG. 2A schematically illustrates three swaths $2200_n \ldots 220_{n+2}$ of the surface 11 as the image 3 is being printed thereon. The print head 150 comprises first nozzles 152, second nozzles 154 and a camera 156, all of which are arranged for facing the surface 11. The print head further is provided with an inertial motion measurement unit (IMU) 158, adapted for measuring velocity and/or acceleration of the print head in 6 degrees of movement. The IMU may comprises a gyroscope, accelerometer and the like.

In order to provide accurate positioning of the print head relative to the surface 11, an encoder pattern $210_{n+1}$ has been provided on swath $200_{n+1}$ where a portion of the image is being printed by first nozzles 152. At the same time, second nozzles 154 print a further encoder pattern $210_{n+2}$ on swath $200_{n+2}$, so that the camera can track the further encoder pattern when printing a portion of the image on swath $200_{n+2}$. The accuracy of the further encoder pattern, as well as the accuracy with which the image 3 is printed on the surface, depend on the accuracy with which an initial encoder pattern has been provided on the surface.

When providing such an initial encoder pattern on the surface, no reference to an earlier encoder pattern that has already been provided is available. The initial encoder pattern on the surface may therefore be distorted to some degree, as illustrated in FIG. 2B. FIG. 2B shows an initial encoder pattern $210_0$ as provided on the surface 11. Though the initial encoder pattern ideally should have a main axis which extends parallel to a straight line on the surface, as is the case for the encoder pattern $210_{n+1}$ of FIG. 2A, in practice the initial encoder pattern is often provided on the surface in a somewhat distorted fashion. This is illustrated in FIG. 2B by the initial encoder pattern having its main axis along a curve.

Figure 3:
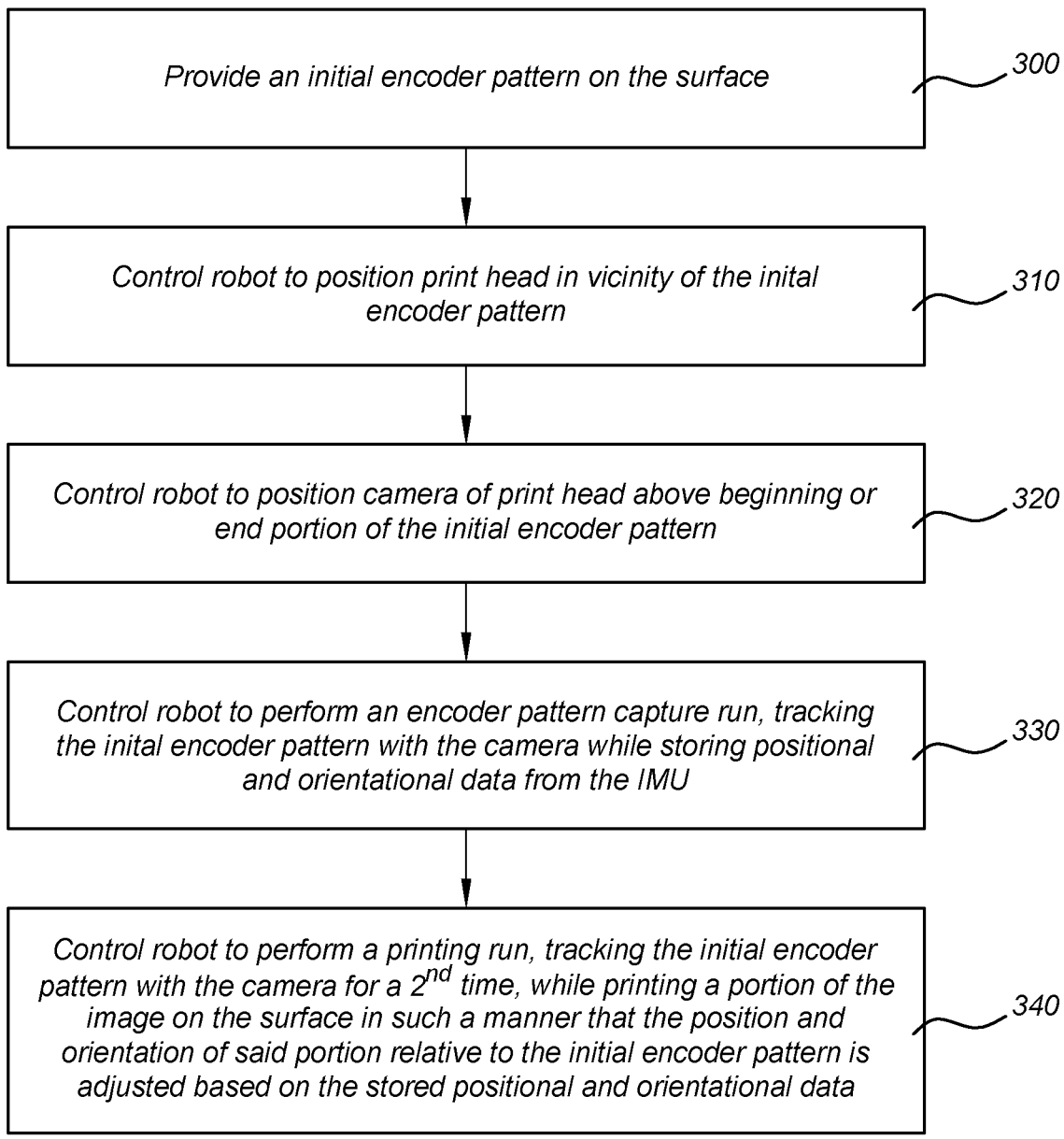

FIG. 3 shows a flow chart of a method of the present invention which aims to allow an image to be printed accurately on a surface, even if an initial encoder pattern which is provided on the surface has been distorted. The method makes use of a printing robot comprising a base and a print head, wherein the print head is moveable relative to the base in at least 6 degrees of freedom of movement, and wherein a camera is fixed with respect to the print head and positioned to capture a portion of the initial encoder pattern. The print head of the robot is further provided with one or more inertial measurement units (IMU's) which can measure acceleration of the print head in 6 degrees of freedom. The robot comprises sensors, typically encoders, for determining relative movement respectively between the base and the mast, between the mast and the arm and between the arm and the wrist. Such encoders may be attached to electro motors for driving relative movements between the base and mast, mast and arm and arm and wrist.

In step 300 an initial encoder pattern is provided on the surface, for instance by applying a tape or foil on which the initial encoder pattern has been printed, on the surface near a predetermined location on the surface, or by projecting the initial encoder pattern on the surface using a light projector which is spaced apart from the robot and from the surface on which the encoder pattern is projected. In both cases resulting initial encoder pattern on the surface will likely be distorted to some extent.

In step 310 the robot is controlled to coarsely position the print head in the vicinity of the initial encoder pattern. This may entail controlling the robot, while the robot is in a drive mode, such that the robot is driven across the floor, and subsequently placing the robot in a park mode and controlling the mast and arm in such a manner that the print head is positioned near the predetermined location on the surface until the camera can capture an image of a portion of the encoder pattern. From such a captured image of a portion of the encoder pattern a relative position and orientation of the camera relative to the encoder pattern can be determined. Generally the distance of the encoder head to the surface is not determined from the captured image of the initial encoder pattern. This distance is measured using distance sensors which are provided on the print head In step 320 the robot is controlled to position the print head in such a manner that the camera can capture a beginning or end portion of the initial encoder pattern. Typically this entails moving the print head while the camera tracks the encoder pattern until it is clear that the camera is placed over the beginning or end portion. During tracking, the measurements from the distance sensors are used for keeping the print head within a predetermined range of between 0.2 and 1.2 cm from the surface.

In step 330 an encoder pattern capture run is carried out during which the print head is moved from one end of the initial encoder pattern while the camera tracks the encoder pattern. During this movement, inertial data measured by the one or more IMU's on the print head are stored in a memory together with associated positional and orientational data of the camera relative to the initial encoder pattern derived from portions of the initial encoder pattern captured by the camera during the movement. This step is preferably carries out at a relatively low speed so that more accurate inertial data can be collected from the IMU's.

In step 340 a portion of the image, e.g. a logo or a photo, is printed on the surface during a printing run. This is done by controlling the robot to move the print head along the initial encoder pattern for a second time, while printing the portion of the image on the surface in such a manner that the position and orientation of said portion relative to the initial encoder pattern is adjusted based on the stored positional and orientational data. The adjustment may for instance comprise adjusting the nozzle ejection timing, adjusting the position and/or orientation of the print head relative to the initial encoder pattern, or, when the image to be printed is stored in a digital memory, dynamically offsetting the image in the memory.

FIG. 4 shows a flow chart of a preferred method of the invention, in which the initial encoder pattern is printed onto the surface using the same robot with which the encoder pattern capture run and printing run are carried out. In step 400 a robot, e.g. the robot 100 of FIG. 1, is controlled to position the print head at a substantially predetermined location over the surface, with the print head arranged such that the nozzles are within a distance between 0.1 and 1.2 cm from the surface. The accuracy with which the print head is arranged over the surface may be significantly lower than the printing resolution of the print head. For instance, if the print head is adapted for printing at a resolution of at least 200 DPI, whereas during step 400 the print robot is only capable of positioning the print hear relative to the surface with an accuracy of one tenth of an inch. Though this may cause a slight shift of the entire image that is to be printed on the surface, this initial positioning inaccuracy will not result in warping of the image. In order to facilitate positioning the print head in the vicinity of the predetermined location, the predetermined location may be illuminated using a laser pointer.

In step 410 the robot is controlled to print an initial encoder pattern on the surface, during which the robot will typically be in a parked mode. Nonetheless the print head is susceptible to undesired vibrations as it moved along the surface, due to the large size of the robot and the fact that the components of the robot, which include the mast, the arm and the wrist, are moveably connected with respect to each other. In practice, the resulting initial encoder pattern on the surface will therefore be printed on the surface with an accuracy that is generally less than the printing resolution of the print head, i.e. will be somewhat distorted.

In step 420, an encoder pattern capture run is carried out during which encoder head is moved across the surface while the camera tracks the initial encoder pattern from a beginning to an end of the pattern. During the run, data measured by the IMU together with associated positional and orientational data of the camera relative to the initial encoder pattern derived from portions of the initial encoder pattern captured by the camera during the movement; are stored in a memory, optionally also together with sensor data from encoders on the robot. Such encoders provide data on the relative positions between components of the robots, such as between the base and the mast, between the mast and the arm, and between the arm and the wrist. Based on the inertial data, and optionally also the sensor data from the encoders, an estimate of the movement of the print head during the run can be calculated. If the initial encoder pattern was printed on the surface substantially without distortions, then this estimated movement should correspond substantially with the positional and orientational data that is derived from the portions of the encoder pattern captured by the camera during the run. If the estimated movement deviates from the positional and orientational data by more than the printing resolution, then compensating for such deviations during printing will likely improve the printing accuracy.

In step 430 printing of a portion of the image is carried out during a printing run. During the printing run the robot is controlled to move the print head such that the camera tracks the initial encoder pattern for a second time, while at the same time controlling the movement of the print head and controlling the nozzles to eject print medium onto the surface to print a portion of the image on the surface in such a manner that the orientation and/or position of said portion relative to the initial encoder pattern is adjusted based on the inertial data and associated positional data of the camera that was stored in the memory during the encoder pattern capture run.

Optionally, during the printing run, a further encoder pattern may be printed on an adjacent swath of the surface. The further encoder pattern can be tracked when the next swath of the image is printed.

In summary, the invention relates to method and system for printing an image on a 3D surface, wherein a printing robot is controlled to first carry out an encoder pattern capture run. During this run a print head of the robot is controlled to track an encoder pattern, which may be slightly distorted, on the 3D surface while inertial data from an inertial data measurement unit that is fixed to the print head is stored together with orientational and positional data derived from an image captured of a portion of the encoder pattern that is captured by a camera mounted on the printing head. Next, during a printing run, the print head is controlled such that the camera tracks the encoder pattern for a second time, while printing by the print head and/or a position of the print head is adjusted based on the inertial and orientational and positional data that were stored during the encoder pattern capture run.

The invention claimed is:

1. A method for printing an image onto a three dimensional curved surface of an object, such as an aircraft, using:
a printing robot comprising a base, an arm supported by the base and moveable relative to the base, a print head having a plurality of nozzles coupled to a source of printing medium, the arm carrying the print head, wherein the print head is adapted for ejecting printing medium based on a control signal and is moveable relative to the base in at least six degrees of freedom of movement for causing relative movement of the print head along the curved surface, the printing robot further comprising a camera arranged at the end of the arm and adapted for capturing images of the curved surface; an internal position determination system comprising a plurality of sensors for determining a position and orientation of the print head relative to the base; and an inertial measurement unit (IMU) fixed with respect to the print head and adapted for providing inertial data on the print head;

the method comprising the steps of:

during an encoder pattern capture run: controlling the printing robot to move the print head across a first swath of the surface in such a manner that the camera tracks an initial encoder pattern on the surface, and, during the movement of the print head, storing in a memory inertial data measured by the IMU together with associated positional and orientational data of the camera relative to the initial encoder pattern derived from portions of the initial encoder pattern captured by the camera during the movement; and during a printing run: controlling the printing robot to move the print head across said first swath in such a manner that the camera tracks the initial encoder pattern on the surface, and controlling the movement of the print head and controlling the nozzles to eject print medium onto the surface to print a portion of the image on the surface in such a manner that the orientation and/or position of said portion relative to the initial encoder pattern is adjusted based on the inertial data and associated positional data of the camera that was stored in the memory during the encoder pattern capture run, wherein the method further comprises, prior to the encoder pattern capture run, a step of providing the initial encoder pattern across the first swath of the surface, wherein said providing the initial encoder pattern comprises using a light projector that is spaced apart from the printing robot, or wherein the step of providing the initial encoder pattern comprises attaching a marker strip, which comprises the initial encoder pattern, on the first swath of the surface.

2. The method of claim 1, wherein during the encoder pattern capture run the print head is moved across the first swath at a lower speed than during the printing run, preferably slower by a factor of two or more.

3. The method of claim 1, wherein the image is stored in a memory, and wherein said adjustment of the orientation and/or position of the printed portion relative to the initial encoder patter comprises one or more of: adjusting the nozzle ejection timing, dynamically offsetting the image the memory; and adjusting the position and/or orientation of the print head relative to the initial encoder pattern.

4. The method of claim 1, wherein the step of providing the initial encoder pattern comprises controlling the printing robot to move the print head across a first swath of the surface while printing the initial encoder pattern on said first swathe.

5. The method of claim 1, wherein the controller is adapted for controlling the printing robot to position the print head, during the encoder pattern capture run and/or during the printing run, to compensate for high frequency vibrations of the print head based on the inertial data sensed by the IMU during said run.

6. The method of claim 1, wherein the image is a photo or a logo to be printed on the surface at a resolution of 200 DPI or greater.

7. The method of claim 1, wherein the printing robot is further provided with one or more distance sensors which are fixed with respect to the print head and are adapted for measuring a distance of the print head to the curved surface, wherein the controller is further adapted for controlling the print robot to maintaining the print head at a distance of between 0.2 to 1.2 cm to the surface when printing medium is ejected from the nozzles, preferably a distance of between 0.3 to 1 cm.

8. The method of claim 1, wherein the print run comprises printing a further encoder pattern on the surface, to be used in printing an adjacent swath of the image during a subsequent printing run.

9. The method of claim 1, wherein during the encoder pattern capture run, positional and orientational data provided by encoders of the robot are stored along with the inertial data measured by the IMU and the orientational and positional data derived from the encoder pattern, and wherein during the printing run the adjustment is further based on the stored positional and orientational data provided by the encoders.

10. A system for printing an image onto a three dimensional curved surface of an object, such as an aircraft, the system comprising:

a printing robot comprising a base, an arm supported by the base and moveable relative to the base, a print head having a plurality of nozzles coupled to a source of printing medium, the arm carrying the print head, wherein the print head is adapted for ejecting printing medium based on a control signal and is moveable relative to the base in at least six degrees of freedom of movement for causing relative movement of the print head along the curved surface, the printing robot further comprising a camera arranged at the end of the arm and adapted for capturing images of the curved surface; an internal position determination system comprising a plurality of sensors for determining a position and orientation of the print head relative to the base; and an inertial measurement unit (IMU) fixed with respect to the print head and adapted for providing inertial data on the print head;

wherein the printing robot comprises a vertical mast of a height of at least 10 m, wherein the vertical mast is supported on the base and rotatable relative to the base around a vertical axis, wherein the arm is moveably supported by the mast in such a manner that the arm can move relative to the mast along the vertical axis and is rotatable relative to the mast about a horizontal axis, the arm having a length of at least 5 m the system further comprising a controller adapted for:

during an encoder pattern capture run: controlling the printing robot to move the print head across a first swath of the surface in such a manner that the camera tracks an initial encoder pattern on the surface, and, during the movement of the print head, storing in a memory inertial data measured by the IMU together with associated positional and orientational data of the camera relative to the initial encoder pattern derived from portions of the initial encoder pattern captured by the camera during the movement; and during a printing run: controlling the printing robot to move the print head across said first swath in such a manner that the camera tracks the initial encoder pattern on the surface, and controlling the movement of the print head and controlling the nozzles to eject printing medium onto the surface to print a portion of the image on the surface in such a manner that the orientation and/or position of said portion relative to the initial encoder pattern is adjusted based on the inertial data and associated positional data of the camera that was stored in the memory during the encoder pattern capture run.

11. The system of claim 10, wherein the first swath extends substantially linearly and wherein the controller is adapted for controlling the print robot relative to the surface during movement of the print head across the first swath in such a manner that the print head is moved in a non-linear manner relative to the base and/or in such a manner that during movement of the print head across the first swath the print head is moved relative to the curved surface at a variable speed.

12. The system of claim 10, wherein the nozzles of the print head span an area that is smaller than an area of the image that is to be printed on the surface.

13. The system of claim 10, wherein the printing robot is provided with one or more distance sensors which are fixed with respect to the print head and are adapted for measuring a distance of the print head to the curved surface, and wherein the controller is further adapted for controlling the print robot to maintaining the print head at a distance of between 0.2 to 1.2 cm to the surface when printing medium is ejected from the nozzles, preferably a distance of between 0.3 to 1 cm.

14. The system of claim 10, wherein the controller is adapted for controlling the printing robot to position the print head, during the encoder pattern capture run and/or during the printing run, to compensate for high frequency vibrations of the print head based on the inertial data sensed by the IMU during said run.

15. The system of claim 10, wherein the robot further comprises encoders for sensing positional and/or orientational data of components of the robot, wherein the controller is further adapted for, during the encoder pattern capture run, storing the positional and/or orientational data sensed by the encoders in the memory along with the inertial data measured by the IMU and the positional and orientational positional data derived from the encoder pattern, and wherein the controller is adapted for, during the printing run, printing the portion of the image further based on the stored orientational and/or positional data from the encoders.

* * * * *